Oct. 9, 1923.

T. A. MELVILLE 1,470,279

ELEVATOR INTERLOCK

Filed June 12, 1922    6 Sheets-Sheet 1

Fig.1.

Inventor
T.A.Melville,

By M. M. Cady
Attorney

T. A. MELVILLE

ELEVATOR INTERLOCK

Filed June 12, 1922    6 Sheets-Sheet 5

Inventor
T. A. Melville,
By M. M. Cady
Attorney

Patented Oct. 9, 1923.

1,470,279

UNITED STATES PATENT OFFICE.

THOMAS A. MELVILLE, OF JEROME, ARIZONA.

ELEVATOR INTERLOCK.

Application filed June 12, 1922. Serial No. 567,759.

*To all whom it may concern:*

Be it known that I, THOMAS ACKERSON MELVILLE, a native citizen of the United States, residing at the city of Jerome, in the county of Yavapai and State of Arizona, have invented certain new and useful Improvements in Elevator Interlocks, of which the following is a specification.

An important object of the invention is to provide a safety elevator interlock, which will be purely mechanical in its action and which will combine in it all the safety features required of a safety elevator interlock, to wit:—

1. Impossibility to unlock or open a shaft door from the outside of the shaft at any time except in case of emergency, when a special means must be employed.

2. Impossibility for any one, other than the car operator, to unlock or open a shaft door from within the car.

3. Impossibility for the operator to unlock a shaft door or to open a shaft door from within the car when the car controller is not in the stop position.

4. Impossibility to unlock or open a shaft door from within the car when the car is not in the correct and safe position with respect to a landing.

5. Locking of the car controller before a shaft door can be unlocked and opened, and remaining locked during the entire time the door is unlocked and open so that the car cannot be moved from a landing at any time unless the door is not only closed, but locked.

Another object of the invention is to provide such a device which will be simple in its construction and operation, requiring very little clearance or space in the elevator shaft or in the car; containing but few moving parts; and with but a single spring in the entire mechanism, with provision whereby should said spring break or fail to operate, the car cannot be moved.

Another object of the invention is to provide a springless shaft door lock as a part of the safety elevator interlock mechanism.

Another object of the invention is to provide means whereby when the car is in proper position where a door may be opened, the door lock, the car controller lock, and the door itself, are connected by one continuous train of mechanism and form one single device, all the parts of which are moved at the same time by the same operating means within the car, and all of which are rendered inoperative by the opening of the door, so that when any one of these parts operates, all must operate.

With these and other objects in view as will be hereinafter more fully pointed out as the description progresses, reference will be had to the accompanying drawings forming a part of this specification and wherein like numerals of references designate corresponding parts through the several views, in which:—

Figs. 7, 8, 9 being of the controller lock; Figs. 10, 11, 12 of the door lock operating mechanism; Figs. 13, 14, 15 of the door lock; Figs. 16, 17, 18 of the operating pedal; and Figs. 19, 20, 21 of the door lock operating mechanism and door lock. Figs. 7, 10, 13, 16, 19 show the associated parts in one position; Figs. 8, 11, 14, 17, 20 showing the same parts in another position; and Figs. 9, 12, 15, 18, 21 showing them in still another position.

Figure 5:
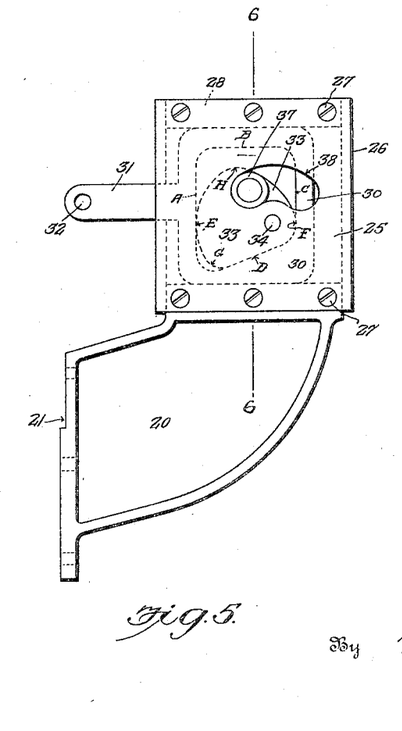
Fig. 5 is an enlarged detail view in elevation of part of the door locking mechanism.
Figure 6:
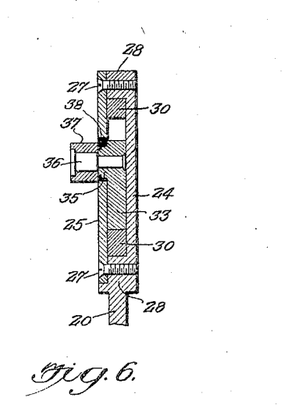
Fig. 6 is a vertical section view taken therethrough on line 6—6 of Fig. 5, Figs. 7 to 21 inclusive are correlated diagrammatical views on two sheets which are to be read placed side by side.

Referring to the drawings, reference numeral 2 designates a front wall portion, 3 a side wall portion, and 4 the floor of the elevated car. The shaft door 5 slides in track 6 and is provided with upper and lower rollers 7 and 8 set in the door and having portions thereof extending beyond the front and rear faces of the door, the upper roller engaging a track 9 provided on the shaft side of the shaft wall 10. In position to engage behind the shaft door 5, when the same is fully closed, is a door locking plate 14, having a curled or beaded upper edge 15, a flanged end abutment 16, and along its entire bottom edge being formed with a hinge portion 17 by which it is joined with a similar hinge portion formed on the upper edge of a complementary plate 18 suitably secured to some part of the shaft adjacent the floor or landing 19. One convenient manner of securing the complementary plate 18 in position is by forming the bracket 20, with a seat or clearance 21, to receive said plate 18, said bracket 20 itself being rigidly secured to a floor beam 22 so as to project into the shaft on one side of the elevator car and adjacent the car wall 3. This bracket, as more clearly illustrated in Figs. 5 and 6, is formed at its upper portion with an integral housing wall 24, and a removable housing wall or plate 25, the latter having front and rear flanges 26 and being removably secured in place by screws or the like 27. The front and rear wall members 24 and 25 are spaced apart by integral bracket portions 28 and between these portions and the wall members 24 and 25 is located a sliding yoke 30, formed with an integral arm 31 by means of which it is pivotally connected at 32 with the door locking plate member 14.

Figure 1:
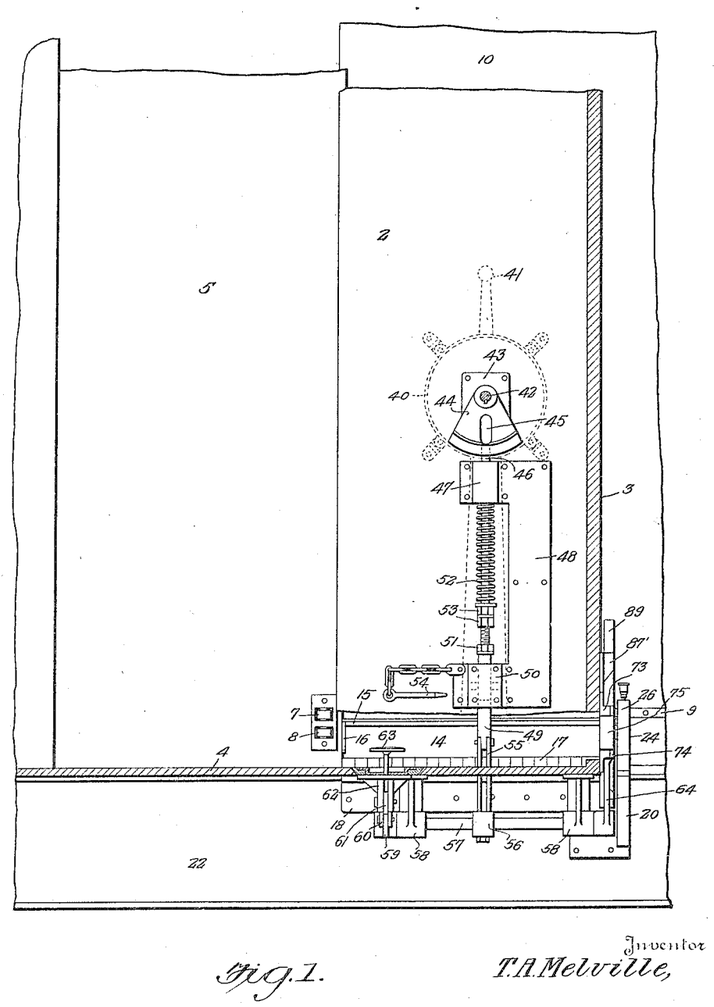
Fig. 1 is a view in elevation from within the car of the lower portion of a corner of the car and the lower portion of the shaft door and sections of the adjacent shaft, with part of the wall of the car cut away to show the door lock.
Figures 2, 3:
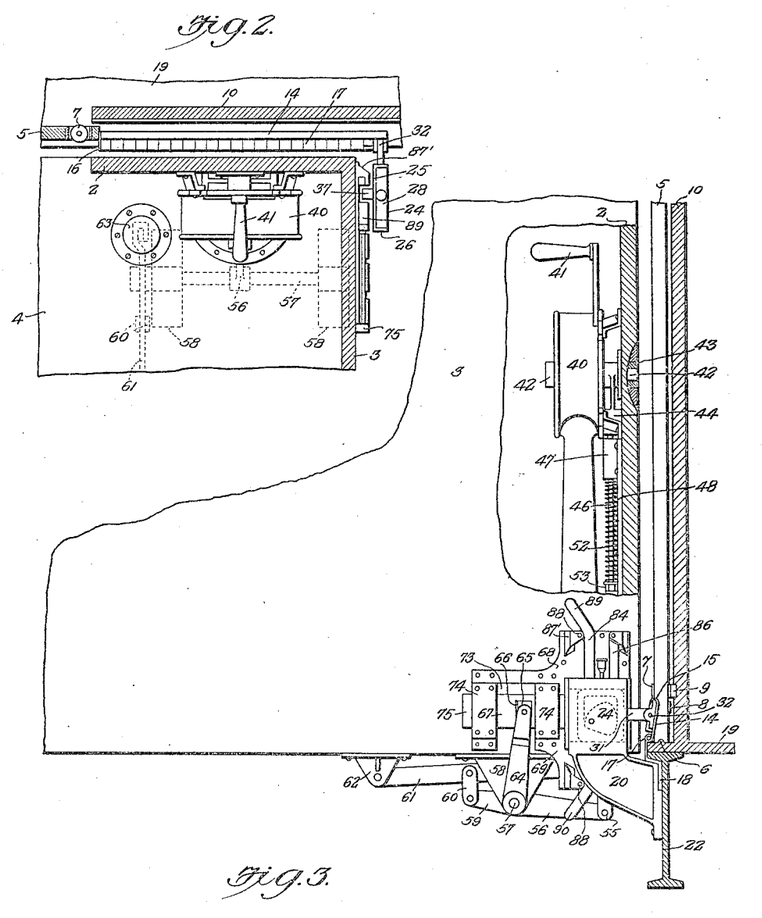
Fig. 2 is a horizontal sectional view thereof, viewed from above.
Fig. 3 is a view in side elevation of the lower portion of an outside front corner of the car, door, and sections of the adjacent shaft, with part of the wall of the car cut away to show the controller lock.
Figure 13:
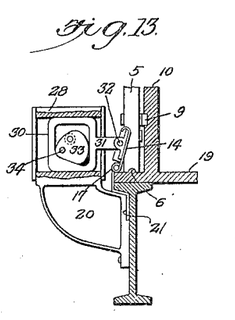
Figure 14:
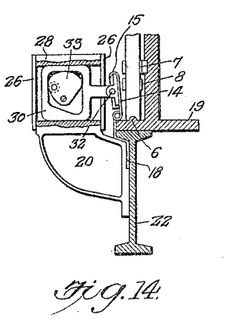
Figure 15:
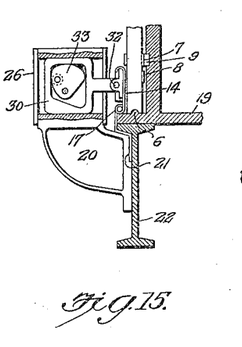
Figures 16, 19:
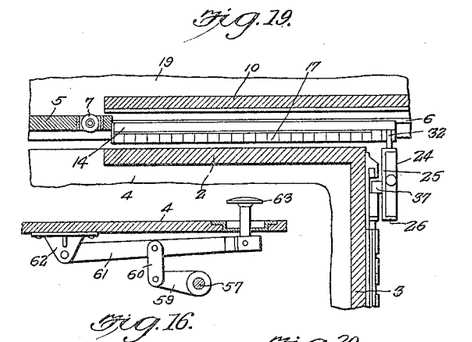
Figures 17, 20:
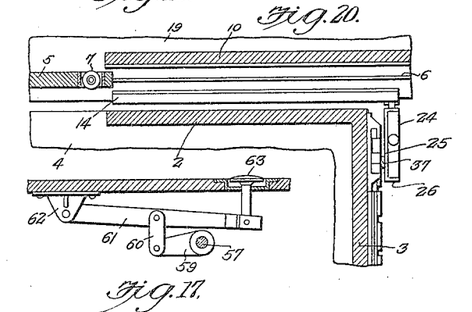
Figures 18, 21:
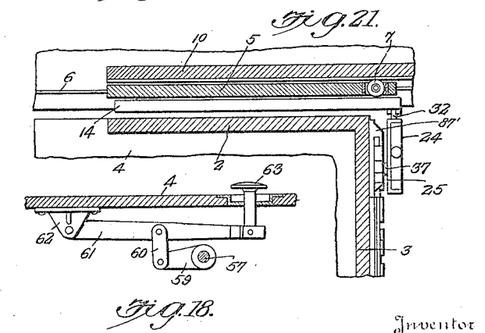
Figures 22, 24, 29, 30:
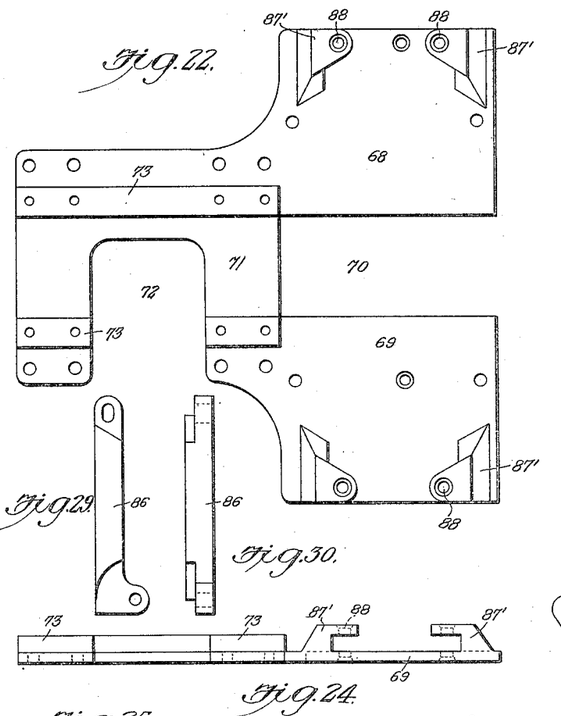
Fig. 22 is a front elevation of the door lock operating bolt housing plate.
Fig. 24 is a top plan view of Fig. 22.
Fig. 29 is a front elevation of another slot forming wing.
Fig. 30 is a front edge view thereof.
Figure 23:
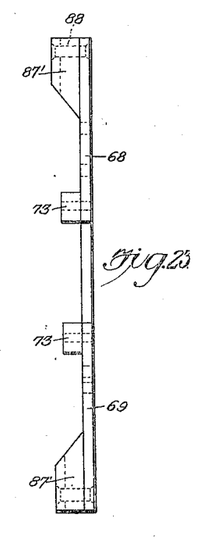
Fig. 23 is an end view of Fig. 22.
Figure 25:
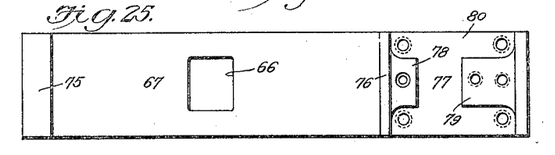
Fig. 25 is a front elevation of the door lock operating bolt.
Figure 26:
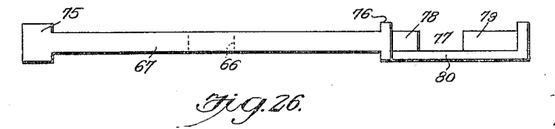
Fig. 26 is a bottom edge view thereof.
Figure 27:
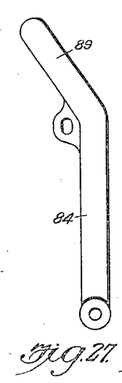
Fig. 27 is a front elevation of one of the slot forming wings.
Figure 28:
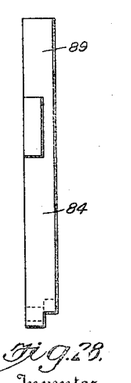
Fig. 28 is a rear edge view of Fig. 27.

The yoke is provided with an opening having a vertical front wall A, a horizontal top wall B at right angles thereto, a vertical rear wall C parallel to wall A and at right angles to wall B, and a bottom wall D obliquely disposed at an acute angle to wall A and at an obtuse angle to wall C. Within this opening in the yoke is pivoted a cam 33 by means of a transverse pivot pin 34 extending through the walls 24 and 25 of the bracket housing and also through the cam 33. This cam is formed on the side adjacent the elevator car with an integral boss 35 through which extends a pin 36 provided with a roller 37. One end of this pin is headed and the head countersunk within the end of the roller and the other end of the pin is riveted or otherwise suitably secured to the cam 33. The boss 35 extends through the removable housing wall or plate 25, the latter being formed with an arcuate opening or slot 38, concentric with the pivot pin 34. The roller 37, as better seen in Fig. 2, extends toward the elevator car to be engaged by the door lock operating mechanism carried by the car as will be later described. The cam 33 is substantially triangular with two gradually curved side walls and one straight side wall, the latter, in the door locking position of the cam as illustrated in Fig. 13 engaging the oblique wall D of the yoke, while opposite nose portions E and F of the cam engage the side walls A and C of the yoke. When the cam is in the door unlocking position as illustrated in Fig. 14, opposite nose portions G and H of the cam are then engaged with the walls A and C of the yoke, the object of these two engagements in both positions of the cam being to lock the yoke and the door locking mechanism against movement except when the cam is positively operated by its roller 37 being engaged by the door lock operating mechanism on the car.

Figure 7:
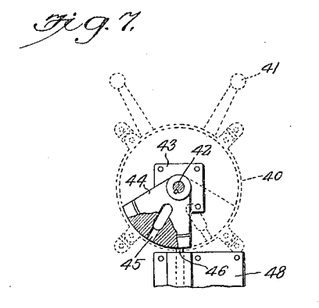
Figure 8:
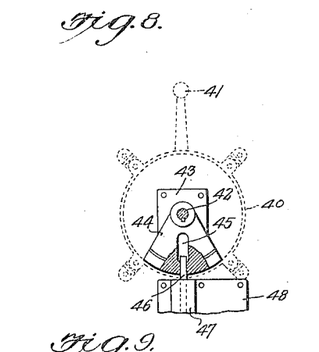
Figure 9:
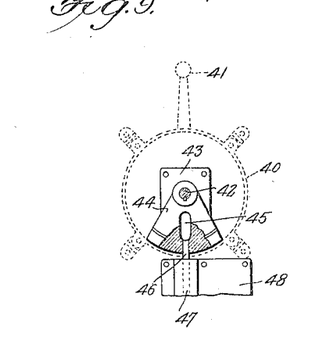
Figure 10:
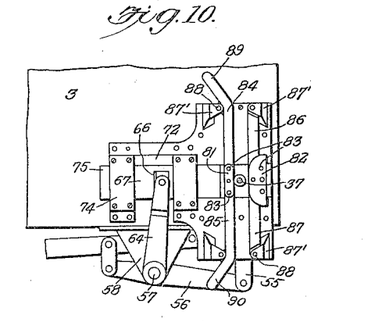

The car is equipped with the usual controller 40 having an operating handle 41 and its shaft 42 extended rearwardly as one piece or with an extension piece where it is journaled in a bearing member 43 sunk into the wall 2 of the car. Keyed to this shaft 42 between the controller casing 40 and the car wall 2 is a depending controller locking segment 44 provided centrally of its lower curved working face with a locking recess 45, best shown in Figs. 7, 8 and 9. Directly beneath this segment and in line with the controller shaft operates a vertically movable segment locking plunger 46 slidingly held in arm 47 of the bearing bracket 48 mounted on the car wall 2. This plunger is threaded at its lower end and screwed into a lower plunger section 49, which is square in cross section and slidingly received in a lower bearing arm 50 of the said bracket 48 in a manner not to turn therein. When the desired adjustment as to length is obtained between the plunger parts 46 and 49, the jam nut 51 is screwed down on the thread of the part 46 against the part 49 with a lock washer interposed if desired, as most clearly illustrated in Fig. 4. The plunger is normally urged downwardly by means of a surrounding coil spring 52 bearing at its upper end against the upper arm 47 of the bracket 48 and at its lower end bearing against the upper of a pair of nuts 53. One of these nuts 53 is a jam nut for the other and a lock washer may be interposed. This is the only spring employed in the entire mechanism comprising this invention. Locking pin 54 is provided to be received in the openings in plunger 49 and arm 50.

Figure 4:
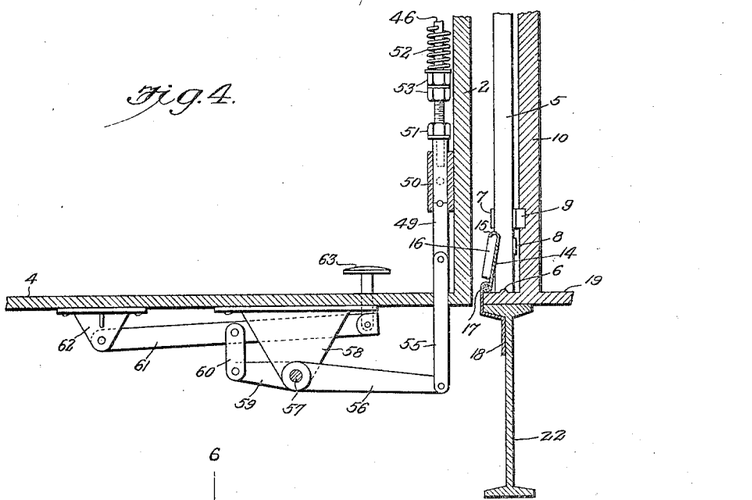
Fig. 4 is a vertical sectional view corresponding to Fig. 3 as to the point of observation, only with some of the parts in the foreground broken away.

To the lower end of the lower plunger part 49 is pivotally connected a pair of parallel spaced links 55 pivoted at their lower ends to the free end of an arm 56 extending from a rock shaft 57 toward the front wall of the car as most clearly illustrated in Fig. 4. This rock shaft is journaled at its end in bearing brackets 58 depending from the car floor. The end of the rock shaft 57 farthest from the side wall 3 of the car is provided with an arm 59 connected by a pair of links 60 (see Figs. 2 and 3) with a foot lever 61, and this lever is pivoted at its rear end, or that end farthest from the front wall of the car, to a depending bracket 62, and its forward end has pivoted thereto a foot treadle 63, the stem of which works through the car floor 4.

To the end of the shaft 57, adjacent the elevator shaft is fixed an arm 64, the upper end of which is pivoted to a slide block 65 having a limited vertical movement within an opening 66 formed in a horizontally reciprocating bolt 67. This bolt works in a member comprising a pair of plates 68 and 69 spaced apart at their front portions to form way 70, but connected at their rear portions by web portion 71 notched out as at 72 to accommodate the bifurcated upper end of arm 64. The upper and lower portions of this web 71 are provided with guide flanges 73 between which bolt 67 operates. A pair of parallel plates 74 are applied to the flanges 73 and between them and the web portion 71, the bolt 67 is confined. At its rear end, the bolt 67 is provided with an enlargement 75, which engages the rear edge of the web 71 and the rear plate 74 to limit forward movement of the bolt, while rearward movement of the bolt is limited by pedal 63 seating in the socket in the car floor. The front end portion of the bolt 67 is formed with a transverse groove 77 between portions 78 and 79 which project from a base plate 80, and to the portion 78 is secured a plate 81, while to the other portion 79 is secured a plate 82. Both of these plates project beyond the top and bottom edges of the portions 78 and 79 and between these projecting ends and the base plate 80 are pivoted, at points 83, four slot forming wings 84, 85, 86, and 87. The upper and lower bracket plates 68, 69 are formed with ears 87', between which and said plates 68, 69 the outer end portions of the four wings are pivoted as at 88. The rear wings 84 and 85 have rearward extensions 89 and 90 which aid in guiding the roller 37 of the door locking mechanism into the slot between said wings.

The shaft mechanism illustrated and described are duplicated at each floor or landing, and hence a description of the operation of the parts at one floor or landing will suffice for all.

As the car moves up and down the shaft, the roller 37 will pass into and out of the slot formed between the wings 84, 85 and the wings 86, 87 to be operated or not by said wings to lock or unlock the shaft door as the case may be according to which position the wings have or have not been moved to by the pedal mechanism of the car.

Figure 11:
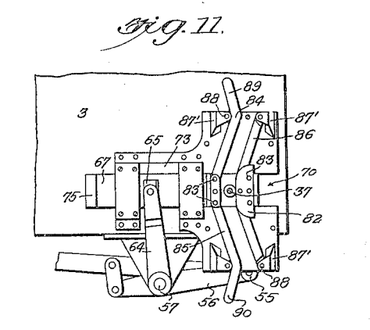
Figure 12:
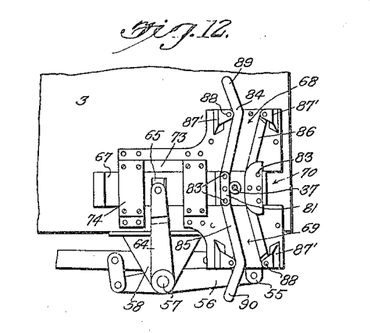

Referring to Figs. 7, 10, 13, 16 and 19, the shaft door is shown to be closed and locked by the locking plate 14 being projected behind its rear edge, and owing to the position of the cam, the door, the locking plate 14, or the yoke 30 cannot be moved until roller 37 of the cam is engaged by the operating mechanism on the car to swing the cam in a rearward direction. Should it be desired to unlock the shaft door from without the shaft, some special means must be provided for swinging the cam to permit and cause removal of the locking plate 14 from behind the rear edge of the shaft door. As the car moves upwardly toward the landing, the controller will be in the Fig. 7 position, the slot forming wings in the Fig. 10 position. If it is not desired to stop the car at the particular landing, the roller 37 of the door locking mechanism merely passes into and out of the slot formed by the wings 84, 85, 86, 87 and the door locking mechanism is not operated and remains in the Fig. 13 position. If, however, the car is to stop at the landing, the controller is moved with the roller 37 in the Fig. 10 position, that is to say, with car floor 4 substantially level with landing floor 19. In this position of the car, the shaft or door locking mechanism is still in the Figs. 13 and 19 position, preventing any direct opening of the shaft door either by the operator or occupants of the car. Before the door can be opened, the operator, whose presence excludes possibility of a passenger performing the operation, must depress foot pedal 63, which depresses lever 61, links 60, arm 59, rocking shaft 57, raising arm 56, links 55, plunger 49—46, causing the upper end of the plunger to enter the recess 45 in the controller locking segment. Rocking of the shaft 57 also causes rearward swinging of the arm 64, thereby sliding the bolt 67 rearwardly and bringing the slot forming wings 84, 85, 86, 87 to the Fig. 11 position. This rearward movement of the wings draws the roller 37 rearwardly, thereby swinging the cam 33 from the Fig. 13 to the Fig. 14 position and swinging the door locking plate 14 from behind the rear of the door. The parts are now in the positions shown in Figs. 8, 11, 14, 17 and 20 and the shaft door is free to be opened.

Before proceeding further with the description of the operation, it will be observed particularly that the normal urge of the spring 52 will constantly maintain the slot forming parts at the side of the car in the locked position and take up all slack in the connections and, in this position, the length of the plunger 46 is so adjusted that its upper end barely touches, or just clears, the lower curved face of the segments 44 so that, upon a depression of the pedal 63 to unlock the door, the top end of the plunger will come in contact with the lower curved surface of the segment and will prevent the doors from being unlocked or the entire interlock operated prior to the moment the control lever 41 is brought to the neutral or stop position, when the plunger 46, under the continued pressure of the foot, will enter the controller locking segment recess 45. The thrust of the plunger upon the segment, caused by the pressure of the foot upon the pedal 63 transmitted to said plunger, will be taken up by the bearing 43 and will not fall directly upon the controller mechanism. Thus it will be observed that before the shaft door can be unlocked, the plunger will be entered sufficiently into the recess 45 of the segment 44 to lock the car controller in the stop position, it will be seen that the parts forming the lock operating slot at the side of the car may, at times, be carried above or below, that is not up to or beyond, the lock roller 37, when it will be found that pressure upon the foot pedal 63 does not cause unlocking of the door. This is because, in order to get the full throw of the pedal operated parts to fully throw the lock operating parts, that the car must come to a stop with the roller substantially in the Fig. 11 position, to obtain which, the car and landing floors must substantially align.

Returning to the parts as they were left in the Figs. 8, 11, 14, 17 and 20 position, the door is found to be unlocked and the controller locked. The door may now be slid rearwardly on its track 6 to full open position, moving to that position between the locking plate 14 and the shaft wall 10. After the door has started to open, pressure of the foot upon the pedal 63 may be removed, but the parts remain about as they were with the controller locked in the Fig. 9 position, the slot forming parts in the Fig. 12 position, the door locking plate 14 in the Fig. 15, the pedal in the Fig. 18 position, and the door locking and door lock operating parts relatively in the Fig. 21 position, all of which positions are about as in Figs. 8, 11, 14, 17, and 20, except that the door locking plate 14 has moved forwardly against the door 5, resting antifrictionally upon the lower door roller 8, thereby preventing return of the controller locking plunger 46 from the controller locking position. Thus, because the controller is locked, the car cannot be moved until the door is not only closed, but locked, because until the locking plate 14 falls behind the door 5, the roller 37 will not permit movement of the parts carried by the car under pressure of the spring 52 to unlock the controller. During the entire opening and closing of the door, the upper locking plate 14 rides on the lower roller 8 carrier by the door, lateral movement of the door under this pressure being resisted by the upper roller 7 riding along the track 9 on the shaft wall.

When the door has been opened in the manner described, they should be immediately closed and locked again before the car is permitted to pass, for the lock roller 37 will be held in the unlocked position out of line with the slot at the side of the car so that the locks will be wrecked if the car should happen to pass when the roller 37 is in this position. To provide a means whereby the door may be locked from within the car when unlocked from the outside of the shaft in the above manner, the back wings 84, 85 are provided with two rearward extensions 89, 90, so that when the car approaches the door that has been thus unlocked, the car may be stopped and the door closed, whereupon, by moving the car slowly past the landing, the lock roller 37, riding on one or the other of these rearward extensions 89, 90 will be returned to the normal locked position.

Should it be desired to leave the car at a landing with the door unlocked and opened, and with the controller locked, the pin 54 is passed through the plunger bracket and plunger, rendering the parts inoperative.

What is claimed is:

1. In a device of the character described, the combination with the shaft door, of means movable into the path of movement of the door to prevent movement thereof, and a cam operating element therefor having a roller mounted thereon for engagement with its operating means, said cam being pivotally mounted and having a portion in the plane of the pivotal point and said plane being parallel to the line of movement of the first means preventing movement of the cam by said first means when in the door locking position.

2. In a device of the character described, the combination with the elevator car and the shaft door, of a door locking means movable into and out of the path of movement of the door, including a yoke and a pivoted cam working therein, said cam having a portion engaging the yoke in a plane through the point of pivot which is parallel to the plane of movement of the yoke to prevent movement of the cam by the yoke when the latter is in the door locking position, and means whereby the cam is operated by the elevator car.

3. In a device of the character described, the combination with the shaft door, of a member hinged to clear the door in one position to unlock the same, and to move behind the door in another position to intercept the same, a member connected to said hinged member and having a pair of spaced parallel walls, a triangular cam pivoted near one corner to work between said walls to operate said first two members, the other two corners of the cam being adapted to move to one side of dead center in the door locking position and to be retained in said position by its own gravity against movement by the first two members, and extraneous means for operating the cam.

4. In an elevator interlock, the combination with the elevator car, the shaft door, and locking means for the door, of operating means for the locking means carried by the car and comprising a base plate, a bolt slidingly mounted therein, a pair of rear and a pair of front members forming a slot between them into which a part of the door locking means is received, the members being pivoted to said bolt and at their outer ends to said base plate, the rear members being formed with rearwardly projecting extensions, and manually operated means for operating said bolt and members to operate the door locking means.

5. In a safety elevator interlocking device, the combination with the shaft door, the elevator car, the controller, means for locking the controller, manually operated mechanism on the car and a guide member adapted to be positioned by said mechanism, of means mounted independently of the car for locking the shaft door comprising a hinged member pivotally secured at the landing, a cam actuating means for said hinged member comprising a cam having a roller thereon adapted to cooperate with said guide member to lock and unlock said door upon actuation of said mechanism.

6. In a safety elevator interlocking device, the combination with the shaft door, the elevator car, the controller, and means for locking the controller, of means mounted independently of the car for locking the shaft door, and a controller lock and shaft door lock operating means comprising in combination, a support plate carried by the elevator car, a plurality of sets of slot forming wings pivotally connected to said support plate near their outer ends and having their adjacent ends joined by links to form toggles, and manually operated actuating means operably connected to said toggles.

7. In a safety elevator interlocking device, the combination with the shaft door, the elevator car, the controller, and means for locking the controller, of means mounted independently of the car for locking the shaft door, and a controller lock and shaft door lock operating means comprising in combination, a support plate carried by the elevator car, a plurality of pairs of links pivotally connected to said support plate at their outer ends, the links of each of said pairs being pivoted at their inner ends to a sliding plate, and means to reciprocate said sliding plate and oscillate said links, the said sliding plate in reciprocating serving to release the said door lock.

In testimony whereof I affix my signature.

THOMAS A. MELVILLE.